United States Patent
Kwon et al.

(10) Patent No.: US 7,421,792 B2
(45) Date of Patent: *Sep. 9, 2008

(54) APPARATUS AND METHOD OF CALIBRATING AZIMUTH OF MOBILE DEVICE

(75) Inventors: Woong Kwon, Seongnam-si (KR); Young-bo Shim, Seoul (KR); Kyung-shik Roh, Seongnam-si (KR); Sang-on Choi, Suwon-si (KR); Woo-sup Han, Yongin-si (KR)

(73) Assignee: Samsung Electronics Co., Ltd., Swon-si (KR)

( * ) Notice: Subject to any disclaimer, the term of this patent is extended or adjusted under 35 U.S.C. 154(b) by 296 days.

This patent is subject to a terminal disclaimer.

(21) Appl. No.: 10/987,319

(22) Filed: Nov. 15, 2004

(65) Prior Publication Data

US 2005/0155240 A1    Jul. 21, 2005

(30) Foreign Application Priority Data

Nov. 13, 2003    (KR) ...................... 10-2003-0080346

(51) Int. Cl.
  *G01C 17/38*    (2006.01)
  *G01P 21/00*    (2006.01)
(52) U.S. Cl. .......................... 33/356; 702/92
(58) Field of Classification Search ............... 33/355 R, 33/363 R, 356–361; 702/92–94; 324/244, 324/260
See application file for complete search history.

(56) References Cited

U.S. PATENT DOCUMENTS

| | | | | | |
|---|---|---|---|---|---|
| 391,534 | A | * | 10/1888 | Hunt | 33/358 |
| 1,990,940 | A | * | 2/1935 | Hand | 33/301 |
| 2,325,365 | A | * | 7/1943 | Britten, Jr. | 33/357 |
| 2,360,330 | A | * | 10/1944 | Chance | 33/359 |
| 2,384,004 | A | * | 9/1945 | Bechberger et al. | 33/356 |
| 3,744,312 | A | * | 7/1973 | Anderson | 33/356 |
| 3,902,252 | A | * | 9/1975 | Farber | 33/361 |
| 4,442,609 | A | * | 4/1984 | Senoo | 33/356 |
| 4,520,360 | A | * | 5/1985 | Schwab | 340/947 |
| 5,095,630 | A | * | 3/1992 | Nomura et al. | 33/356 |
| 5,566,462 | A | * | 10/1996 | Ruston | 33/356 |
| 5,778,543 | A | * | 7/1998 | Schneider et al. | 33/324 |
| 6,141,881 | A | * | 11/2000 | Ayres et al. | 33/361 |
| 6,385,133 | B1 | * | 5/2002 | Miyauchi | 368/10 |
| 6,404,103 | B1 | * | 6/2002 | Suzuki et al. | 310/323.01 |

(Continued)

FOREIGN PATENT DOCUMENTS

JP    61-073013 A    4/1986

(Continued)

*Primary Examiner*—G. Bradley Bennett
*Assistant Examiner*—Amy Cohen Johnson
(74) *Attorney, Agent, or Firm*—Sughrue Mion, PLLC

(57) ABSTRACT

Provided are an apparatus and method of calibrating azimuth of a mobile device. The apparatus includes: a motor; a magnetic field measuring unit disposed in the mobile device and measuring magnetic field data indicating magnitudes of a magnetic field in different directions while being rotated by the motor; and a controller driving the motor, generating a calibration table indicating a correspondence between an actual magnetic field trajectory formed by the magnetic field data and a theoretical magnetic field trajectory and calibrating azimuth of the mobile device using the calibration table.

8 Claims, 3 Drawing Sheets

U.S. PATENT DOCUMENTS 6,408,251 B1 * 6/2002 Azuma ................ 702/92
6,711,517 B2 * 3/2004 Brunstein ............. 702/94
6,785,975 B1 * 9/2004 Campbell et al. ....... 33/356
7,069,663 B2 * 7/2006 Kwon et al. ........... 33/356

FOREIGN PATENT DOCUMENTS

| JP | 62-140015 A | | 6/1987 |
|---|---|---|---|
| JP | 62217875 A | * | 9/1987 |
| JP | 03-152412 A | | 6/1991 |
| JP | 03199914 A | * | 8/1991 |
| JP | 06-341848 A | | 12/1994 |
| JP | 7-218266 A | | 8/1995 |
| JP | 08-105745 A | | 4/1996 |
| JP | 9-304078 A | | 11/1997 |

* cited by examiner

APPARATUS AND METHOD OF CALIBRATING AZIMUTH OF MOBILE DEVICE

BACKGROUND OF THE INVENTION

This application claims the priority of Korean Patent Application No. 2003-80346, filed on Nov. 13, 2003, in the Korean Intellectual Property Office, the disclosure of which is incorporated herein in its entirety by reference.

FIELD OF THE INVENTION

The present invention relates to an azimuth calibration of an electronic compass, and more particularly, to an apparatus and method for calibrating azimuth of a mobile device having an electronic compass, without rotating the mobile device having the electronic compass.

DESCRIPTION OF THE RELATED ART

An electronic compass comprising a magnetic sensor such as a fluxgate device or a magneto-resistive device is widely used in order to recognize a heading direction of mobile devices such as intelligent vehicles, mobile robots, unattended aircrafts, and the like. However, an electronic compass has a bearing error since a metal substance disturbs the earth's magnetic field if the metal substance is placed around the electronic compass.

To avoid an erroneous result in the heading direction of a mobile device, the rotation of the mobile device having the electronic compass is evaluated in units of time, and if the mobile device rotates 360°, magnetic field data is obtained and an azimuth error is calibrated by means of the magnetic field data. In a situation where the azimuth error is not calibrated, the mobile device will move in a wrong direction specified by an orientation value affected by the azimuth error.

SUMMARY OF THE INVENTION

The present invention provides an apparatus and method for calibrating an azimuth of a mobile device having an electronic compass by rotating a motor attached to a magnetic sensor, without rotating the mobile device.

According to an aspect of the present invention, there is provided an apparatus for calibrating azimuth of a mobile device, comprising: a motor; a magnetic field measuring unit installed in the mobile device, measuring magnetic field data indicating magnitudes of a magnetic field in different directions while rotating by the motor; and a controller driving the motor, generating a calibration table indicating a correspondence between an actual magnetic field trajectory formed by the magnetic field data and a theoretical magnetic field trajectory and calibrating azimuth of the mobile device using the calibration table.

According to another aspect of the present invention, there is provided a method of calibrating azimuth of a mobile device, comprising: measuring magnetic field data indicating magnitudes of a magnetic field in different directions by rotating a magnetic sensor installed on the mobile device by a motor and forming an actual magnetic field trajectory using the magnetic field data; generating a calibration table indicating a correspondence between the actual magnetic field trajectory formed by the magnetic field data and a theoretical magnetic field trajectory; and calibrating azimuth of the mobile device using the calibration table.

According to still another aspect of the present invention, there is provided a computer readable medium having recorded thereon a computer program for performing the method of calibrating azimuth of a mobile device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown.

Figure 1:
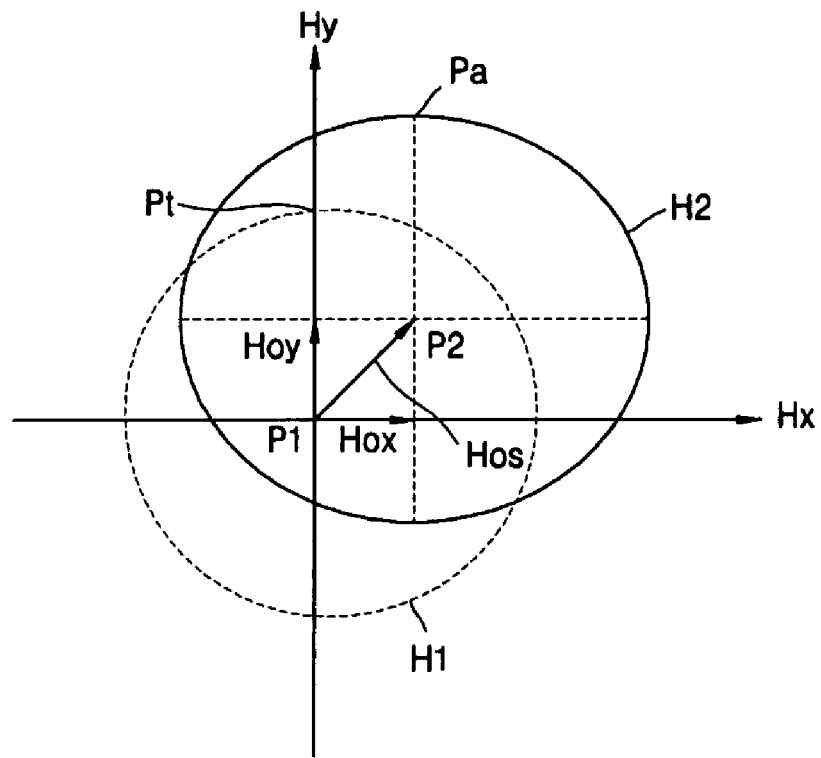
FIG. 1 shows a magnetic field trajectory formed with the rotation of 360° of a mobile device having two magnetic field sensors which are disposed orthogonal to each other.

FIG. 1 is a magnetic field trajectory formed with the rotation of 360° of a mobile device having two magnetic field sensors which are disposed orthogonal to each other. In a linear magnetic flux environment where only the Earth's magnetic field exists, the magnetic field trajectory which is obtained by projecting the magnetic field data sensed by the magnetic field sensors on a two-dimensional plane is a complete circle analogous to H1 shown in FIG. 1. In a curved magnetic flux environment where an external magnetic field coexists with the Earth's magnetic field, disturbance of a magnetic field occurs. As a result, the magnetic field trajectory is a distorted circle analogous to H2, as shown in FIG. 1, in which the center of the circle moves from P1 to P2 due to an offset magnetic field Hos. The offset magnetic field Hos is divided into an x-axis and a y-axis, i.e., an x-axis offset component Hox and a y-axis offset component Hoy. The azimuth of the compass corresponds to an angle at which coordinates on the circle correlate to either the x-axis or the y-axis.

Figure 2:
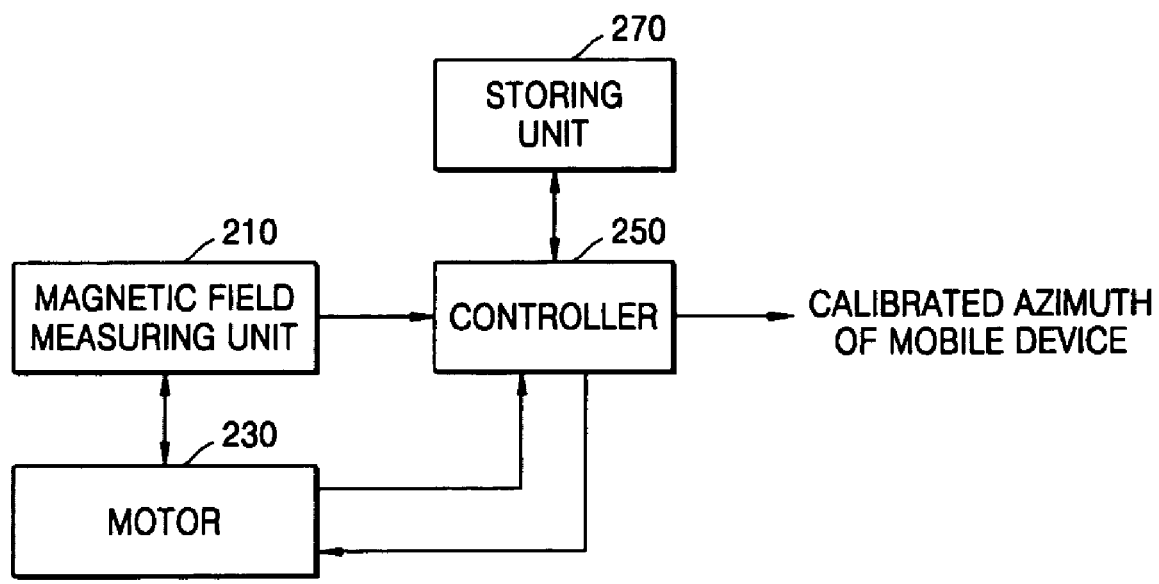
FIG. 2 is a block diagram of an apparatus for calibrating azimuth of a mobile device according to an embodiment of the present invention.

FIG. 2 is a block diagram of an apparatus for calibrating azimuth of a mobile device according to an embodiment of the present invention. The apparatus comprises a magnetic field measuring unit 210, a motor 230, a controller 250, and a storing unit 270.

Referring to FIG. 2, the magnetic field measuring unit 210 comprises a magnetic sensor such as a 2-axis fluxgate device or a magneto-resistive device. As the magnetic field measuring unit 210 rotates more than 360° at each calibration time at a constant rotation speed by the motor 230, the magnetic field measuring unit 210 measures magnetic field data indicating magnitudes of a magnetic field in different directions at each calibration time to form an actual magnetic field trajectory.

The motor 230 has a role of rotating the magnetic field measuring unit 210. A motor having a weak magnetic field such as an ultrasonic motor that does not influence the magnetic field measuring unit 210 may be used. The rotation performed by the motor 230 results in a similar effect of rotating a mobile device to which the magnetic field measuring unit 210 is mounted.

The controller 250 stores a theoretical magnetic field trajectory analogous to H1 of FIG. 1 obtained by rotating the motor 230 under the environment of a linear flux and drives the motor 230 at each calibration time. As the magnetic field measuring unit 210 is rotated by the motor 230, the controller 250 forms an actual magnetic field trajectory analogous to H2 of FIG. 1 using magnetic field data sequentially obtained at a constant angle interval over 360°. The constant angle interval may be adjusted by means of an encoder attached to the motor 230 (not shown). The controller 250 generates a calibration table in which each of coordinates on the actual magnetic field trajectory corresponds to a respective coordinate on the theoretical magnetic field trajectory or a calibration parameter capable of realizing one-to-one correspondence between the actual magnetic field trajectory and the theoretical magnetic field trajectory and stores the calibration table or the calibration parameter in the storing unit 270. The calibration table or the calibration parameter may be updated at each calibration time. Alternatively, a determination may be made as to whether it is necessary to update the calibration table or the calibration parameter depending on the accumulated number of the calibration time in which an offset magnetic field obtained at the calibration time is more than a predetermined threshold. For example, if the determination reveals that update of the calibration table or the calibration parameter in a current calibration time is necessary, azimuths of the mobile device obtained from the magnetic field measurement unit 210 at each sampling time are calibrated using an updated calibration table or an updated calibration parameter until reaching a subsequent calibration time. As a result, a calibrated azimuth of the mobile device is outputted. Meanwhile, if the determination reveals that update of the calibration table or the calibration parameter in a current calibration time is not necessary, azimuths of the mobile device obtained from the magnetic field measurement unit 210 at each sampling time are calibrated using the calibration table or the calibration parameter used in a previous calibration time until reaching a subsequent calibration time. As a consequence, a calibrated azimuth of the mobile device is outputted.

The calibration table makes azimuth Pt obtained from a theoretical magnetic field trajectory analogous to H1 of FIG. 1 correspond to azimuth Pa obtained from an actual magnetic field trajectory analogous to H2 of FIG. 1. Meanwhile, the calibration table may be replaced with the calibration parameter and the calibration parameter according to an embodiment of the present invention may be $A_x$, $H_{ox}$, $A_y$, $H_{oy}$ in Equation 1 as shown below.

$$H_{cx} = \frac{H_x - H_{ox}}{A_x}, H_{cy} = \frac{H_y - H_{ay}}{A_y}$$ [Equation 1]

Herein, $H_{cx}$, $H_{cy}$ are respectively an x component and a y component of a theoretical magnetic field trajectory; $H_x$, $H_y$ are respectively an x component and a y component of an actual magnetic field trajectory; $H_{ox}$, $H_{oy}$ are respectively an x component and a y component of an offset magnetic field; $A_x$, $A_y$ are respectively an x component and a y component of a difference value between the minimum value obtained from an actual magnetic field trajectory and the maximum value obtained from an actual magnetic field trajectory. Calibrated azimuth can be obtained in $$\arctan\left(\frac{H_{cx}}{H_{cy}}\right)$$

from Equation 1.

Figure 3:
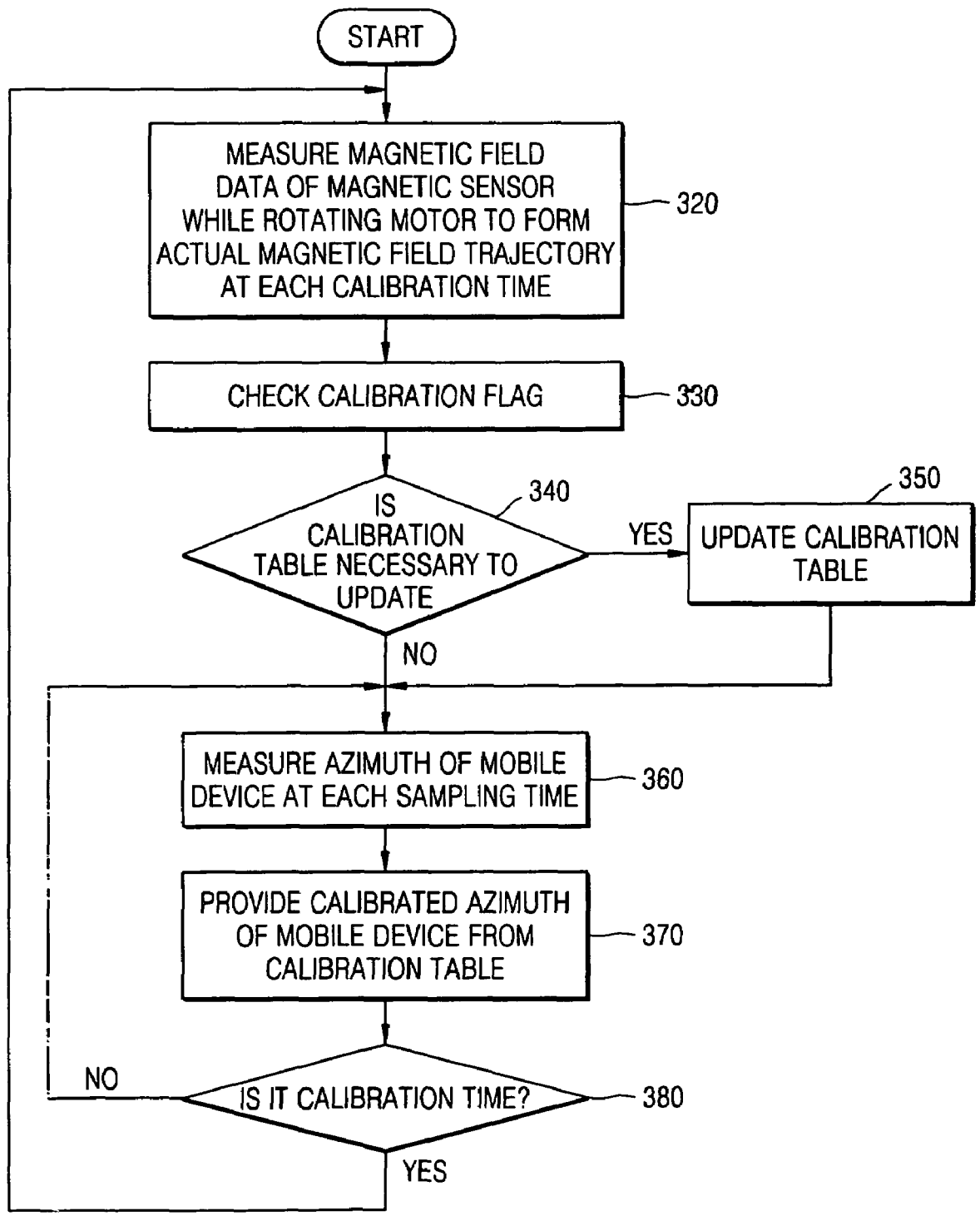
FIG. 3 is a flow chart for explaining a method of calibrating azimuth of a mobile device according to an embodiment of the present invention.

FIG. 3 is a flow chart for explaining a method of calibrating azimuth of a mobile device according to an embodiment of the present invention, which will now be described with reference to FIGS. 1 and 2.

In operation 320, the magnetic field measuring unit 210 measures magnetic field data indicating magnitudes of a magnetic field in different directions over 360° at each calibration time, while being rotated by the motor 230.

In operation 330, a calibration flag is checked by using an X-axis offset component Hox and a Y-axis offset component Hoy of an offset magnetic field Hos obtained from an actual magnetic field trajectory and a theoretical magnetic field trajectory and count values accumulated by a previous calibration time. Operation 330 will be described later with reference to FIG. 4.

In operation 340, it is determined whether update of a calibration table or a calibration parameter is necessary by referring to the calibration flag. When update of the calibration table or the calibration parameter is necessary, i.e., when the calibration flag is 1, in operation 350, the calibration table is updated at the current calibration time and the updated calibration table is stored in the storing unit 270.

In operation 360, azimuth of the mobile device is measured using magnetic field data provided from the magnetic field measuring unit 210 at each sampling time. The azimuth of the mobile device is influenced by not only the Earth's magnetic field but also an external magnetic field. Since a rotation angle of the motor 230 is seen from an encoder (not shown), azimuth of a magnetic sensor is obtained from magnetic field data measured by a rotated magnetic sensor. Azimuth of a mobile device can be calculated by subtracting the rotation angle of the motor 230 from the azimuth of the magnetic sensor.

In operation 370, a calibrated azimuth of the mobile device corresponding to the azimuth obtained from operation 360 is outputted referring to a calibration table or a calibration parameter stored in the storing unit 270 and used in a previous calibration time or a calibration table or a calibration parameter updated from operation 350. The calibrated azimuth of the mobile device is influenced only by the Earth's magnetic field.

In operation 380, it is determined whether a subsequent calibration time has been reached. When a subsequent calibration time is reached, the routine returns to operation 310. Alternatively, when a subsequent calibration time has not been reached, the routine returns to operation 360.

Figure 4:
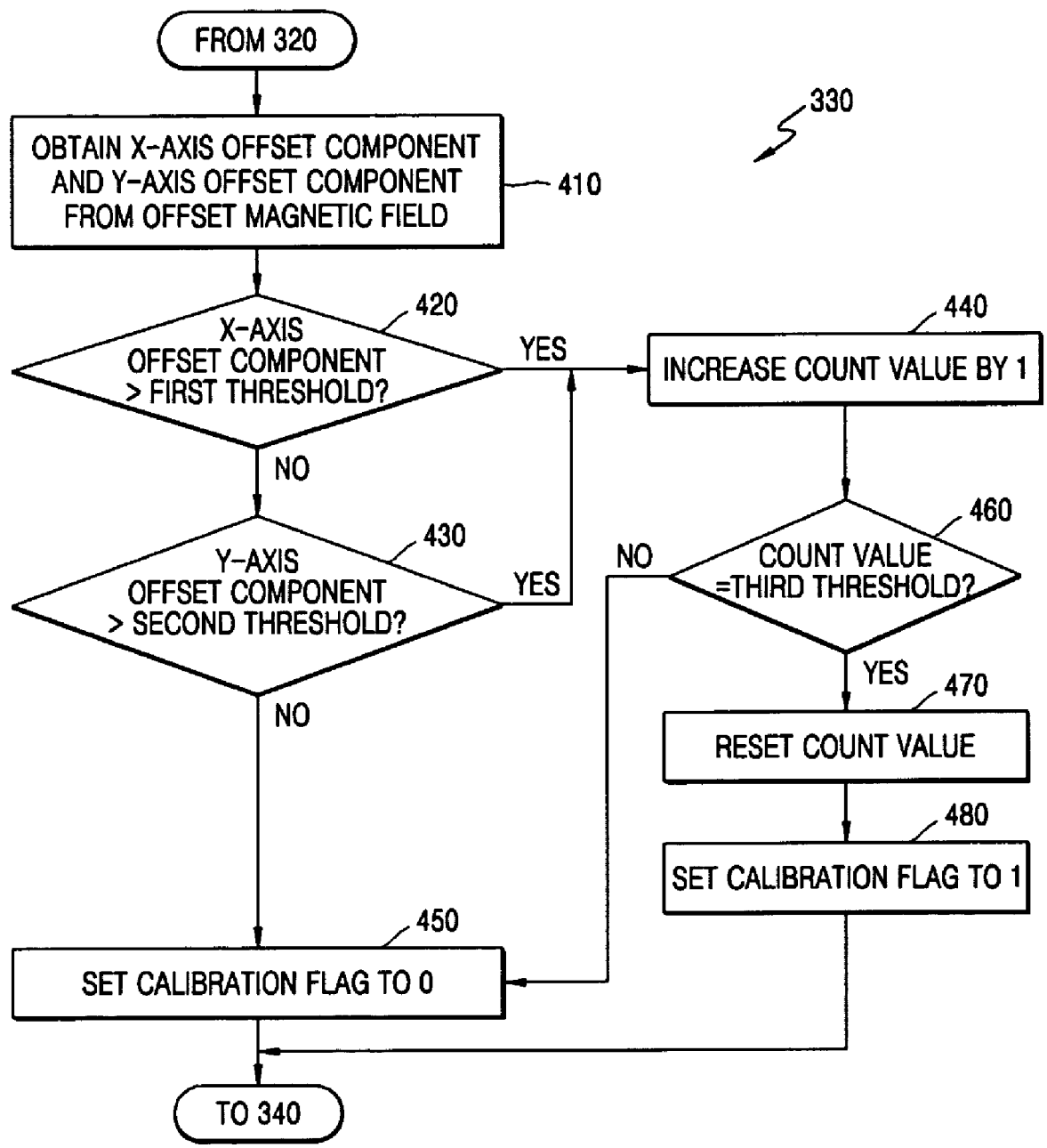
FIG. 4 is a flow chart for explaining operation 330 of FIG. 3.

FIG. 4 is a flow chart for explaining operation 330 of FIG. 3

In operation 410, an offset magnetic field Hos is obtained from an actual magnetic field trajectory analogous to H2 of FIG. 1 formed by the rotation of 360° of the motor 230 and a theoretical magnetic field trajectory analogous to H1 of FIG. 1. Additionally, an X-axis offset component Hox and a Y-axis offset component Hoy of the offset magnetic field Hos are obtained.

In operation 420, the X-axis offset component Hox is compared with a first threshold Th1. When the X-axis offset component Hox is less than or the same as the first threshold Th1, operation 430 is performed. When the X-axis offset component Hox is more than the first threshold Th1, a count value increases by 1 in operation 440. The count value indicates an accumulated number of a calibration time at which it is determined that at least one of the X-axis offset component Hox and the Y-axis offset component Hoy is larger than a corresponding threshold.

In operation 430, the Y-axis offset component Hoy is compared with a second threshold Th2. When the Y-axis offset component Hoy is less than or the same as the second threshold Th2, a calibration flag is set to 0 in operation 450. When the Y-axis offset component Hoy is more than the second threshold Th2, a count value increases by 1 in operation 440.

In operation 460, the count value obtained from operation 440 is compared with a third threshold Th3. When the count value is the same as the third threshold Th3, the count value is reset in operation 470, and the calibration flag is set to 1 in operation 480.

When the X-axis offset component Hox is more than the first threshold Th1, or the Y-axis offset component Hoy is more than the second threshold Th2, 1 is added to the count value. When the count value is the same as a third threshold Th3, a previous calibration table or a previous calibration parameter is updated to obtain a calibrated azimuth of a mobile device using an updated calibration table or an updated calibration parameter. When the X-axis offset component Hox is less than or the same as the first threshold Th1, and the Y-axis offset component Hoy is less than or the same as the second threshold Th2, a calibrated azimuth of a mobile device is obtained using a previous calibration table or a previous calibration parameter.

According to yet another exemplary embodiment of the present invention, there is provided a computer readable medium having recorded thereon a computer program for performing the method of calibrating azimuth of a mobile device. The computer readable recording medium is any data storage device that can store data which can be read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, azimuth of a mobile device having an electronic compass can be calibrated by rotating a motor attached to a magnetic sensor, without rotating the mobile device. Consequently, it is possible to calibrate azimuth of the mobile device even when the mobile device does not move or rotate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for calibrating azimuth of a mobile device, comprising:
   a motor;
   a magnetic field measuring unit disposed in the mobile device and measuring magnetic field data indicating magnitudes of a magnetic field in different directions while being rotated by the motor; and
   a controller driving the motor, generating a calibration parameter including an amplitude and an offset between an actual magnetic field trajectory formed by the magnetic field data and a theoretical magnetic field trajectory and calibrating azimuth of the mobile device using the calibration parameter
   wherein the calibration parameter is updated when an accumulated number, obtained at each calibration time, is a value which equals a predetermined threshold.

2. The apparatus of claim 1, wherein the motor is an ultrasonic motor.

3. The apparatus of claim 1, wherein the calibration parameter is updated at each calibration time.

4. The apparatus of claim 1, wherein the value is increased and compared to the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold.

5. A method of calibrating azimuth of a mobile device, comprising:
   measuring magnetic field data indicating magnitudes of a magnetic field in different directions by rotating a magnetic sensor disposed on the mobile device by a motor and forming an actual magnetic field trajectory using the magnetic field data;
   generating a calibration parameter including an amplitude and an offset between the actual magnetic field trajectory formed by the magnetic field data and a theoretical magnetic field trajectory; and
   calibrating azimuth of the mobile device using the calibration table
   wherein the calibration parameter is updated when an accumulated number, obtained at each calibration time, is a value which equals a predetermined threshold.

6. The method of claim 5, wherein the calibration parameter is updated at each calibration time.

7. The method of claim 5, wherein the value is increased and compared to the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold.

8. A computer readable medium having recorded thereon a computer readable program for performing a method of calibrating azimuth of a mobile device, comprising:
   measuring magnetic field data indicating magnitudes of a magnetic field in different directions by rotating a magnetic sensor disposed on the mobile device by a motor and forming an actual magnetic field trajectory using the magnetic field data;
   generating a calibration parameter including an amplitude and an offset between the actual magnetic field trajectory formed by the magnetic field data and a theoretical magnetic field trajectory; and
   calibrating azimuth of the mobile device using the calibration parameter
   wherein the calibration parameter is updated when an accumulated number, obtained at each calibration time, is a value which equals a predetermined threshold.

* * * * *